United States Patent [19]

Kawashima et al.

[11] Patent Number: 4,458,919

[45] Date of Patent: Jul. 10, 1984

[54] WHEELCHAIR CARRYING VEHICLE

[75] Inventors: Kiyoshi Kawashima, Tokyo; Kenichi Matsuzawa, Sagamihara, both of Japan

[73] Assignee: Nissan Motor Company, Limited, Yokohama, Japan

[21] Appl. No.: 337,135

[22] Filed: Jan. 5, 1982

[30] Foreign Application Priority Data

Jan. 19, 1981 [JP] Japan .................................... 56-6091

[51] Int. Cl.$^3$ .......................... B60R 21/00; A47C 7/36

[52] U.S. Cl. .................................. 280/751; 296/65 A; 297/408; 297/410

[58] Field of Search ............... 280/748, 749, 751, 753; 297/395, 391, 403, 408, 410, 366-369, 379; 403/93, 95-97; 296/84 K, 97 J, 97 G, 65 R, 65 A; 285/302

[56] References Cited

U.S. PATENT DOCUMENTS

| | | | |
|---|---|---|---|
| 3,964,788 | 6/1976 | Kmetyko | 297/395 |
| 4,099,670 | 7/1978 | Cole | 285/302 |
| 4,103,934 | 8/1978 | Arnholt | 280/751 |
| 4,148,525 | 4/1979 | Yamanashi | 297/367 |

*Primary Examiner*—David M. Mitchell

*Assistant Examiner*—Joseph McCarthy

*Attorney, Agent, or Firm*—Lane, Aitken & Kananen

[57] ABSTRACT

A wheelchair carrying vehicle comprising a head rest assembly which comprises a head rest support frame which is rockable about a pivotal axis fixed with respect to the vehicle body structure and located adjacent the roof panel of the body structure and which is lengthwise extensible toward and collapsible away from the aforesaid axis, at least one head rest member supported on the head rest support frame, the support frame being rockable about the aforesaid axis between a position having the head rest member located close to the roof panel and a position having the head rest member positioned adjacent the head portion of an occupant of the wheelchair carrying vehicle, a lock-unlock unit comprising a lock control lever rockable about the aforesaid pivotal axis and securely connected to the head rest support frame, the lock-unlock unit being operable for having the lock control lever selectively locked to and unlocked from the vehicle body structure. The head rest assembly may be one of two head rest assemblies which further comprises a conventional head rest assembly which is positioned in front of or at the rear of the former head rest assembly.

10 Claims, 14 Drawing Figures

WHEELCHAIR CARRYING VEHICLE

FIELD OF THE INVENTION

The present invention relates to a wheelchair carrying vehicle adapted to transport a wheelchair with an invalid or handicapped person seated thereon and, more particularly, to a wheelchair carrying vehicle having incorporated therein a head rest assembly to assist the occupant of the wheelchair to hold his head received thereon.

SUMMARY OF THE INVENTION

In accordance with an outstanding aspect of the present invention, there is provided a wheelchair carrying vehicle having a vehicle body structure including a floor panel and an inner roof panel above the floor panel, the floor panel being adapted to have supported thereon a wheelchair, the vehicle having a head rest assembly which comprises a head rest support frame which is rockable about a pivotal axis fixed with respect to the vehicle body structure and located adjacent the roof panel and which is lengthwise extensible toward and collapsible away from the aforesaid axis, at least one head rest member supported on the head rest support frame, the head rest assembly being rockable about the aforesaid axis between a predetermined uppermost angular position having the head rest member positioned close to the underside of the roof panel and a predetermined lowermost angular position having the head rest member positioned adjacent the head portion of an occupant of the wheelchair, a lock-unlock unit securely held in position adjacent the aforesaid pivotal axis and comprising a lock control lever rockable about the aforesaid pivotal axis and securely connected to the head rest support frame, the lock-unlock unit being operable for having the lock control lever selectively locked to and unlocked from the vehicle body structure; and manually-operated lock-unlock control means operatively connected to the lock-unlock unit for having the lock control lever locked to or unlocked from the vehicle body structure. The lock-unlock unit of the wheelchair carrying vehicle thus constructed and arranged may further comprise first and second support members securely connected to the vehicle body structure and spaced apart substantially in parallel from each other in a direction parallel with the aforesaid pivotal axis, first and second rocking arms which are disposed on the outer and inner sides, respectively, of the first support member and which are rockable together with respect to the first and second support members about a common axis substantially parallel with the aforesaid pivotal axis and fixed with respect to the first and second support member, the lock control lever being selectively locked to and unlocked from the first and second support members, the first and second rocking arms being rockable about the aforesaid common axis in a first direction to have the lock control lever locked to the first and second support members and a second direction to have the lock control lever unlocked from the first and second support members; biasing means connected between the lock control means and the first and second rocking arms and urging the rocking arms for rocking motion in the above mentioned second direction about the aforesaid common axis; a cam member rockable with respect to the first and second support members about the aforesaid pivotal axis; a coupling member providing engagement between the second rocking arm and the cam member for translating an angular movement of the second rocking arm about the aforesaid common axis into an angular movement of the cam member about the aforesaid pivotal axis; a cam follower member rockable with respect to the first and second support members about a cam follower axis substantially parallel with the aforesaid pivotal axis and fixed with respect to the first and second support members, the cam member being engageable with the cam follower member for driving the cam follower member for rocking motion about the cam follower axis when the cam member is caused to turn in one direction about the aforesaid common axis; and a toothed lock member rockable with the cam follower member about the cam follower axis between a predetermined first angular position to have the lock control lever locked to the first and second support members and a predetermined second angular position to have the lock control lever unlocked from the first and second support members, the toothed lock member having an arcuately curved toothed edge portion; the lock control lever having a toothed edge portion arcuately curved about the aforesaid pivotal axis and engageable with the toothed edge portion of the toothed lock member, the respective toothed edge portions of the toothed lock member and the lock control member being held in mesh with each other when the toothed lock member is held in the first angular position thereof and being disengaged from each other when the toothed lock member is held in the second angular position thereof.

In accordance with another outstanding aspect of the present invention, there is provided a wheelchair carrying vehicle havng a vehicle body structure including a floor panel and an inner roof panel above the floor panel, the floor panel being adapted to have supported thereon at least two wheelchairs including first and second wheelchairs, comprising the combination of a first head rest assembly for use with the first wheelchair and a second head rest assembly for use with the second wheelchair, wherein the first head rest assembly comprises (1) a generally U-shaped head rest support frame having a middle portion and a pair of side arm portions pivotally connected at their leading ends to inner side wall portions, respectively, of the vehicle body structure, (2) a head rest pad securely mounted to the middle portion of the support frame, (3) a lock-unlock unit secured to the vehicle body structure, the head rest support frame being thus angularly movable with respect to the vehicle body structure and accordingly to the first wheelchair about the pivoted leading ends of the support frame between a predetermined upper limit position having the head rest pad located close to the underside of thereof panel of the vehicle body structure and a predetermined lower limit position having the head rest pad located immediately at the rear of the portion of an occupant of the first wheelchair, the lock-unlock unit being adapted to have the head rest support frame locked in a desired angular position between these two limit angular positions thereof, and (4) at least one operating lever for manually moving the head rest support frame between the two angular positions, the operating lever being mounted on one of the side arm portions of the head rest support frame and being operatively connected to the lock-unclock unit by a flexible wire, and wherein the second head rest assembly comprises (1) a head rest support frame which is rockable about a pivotal axis fixed with respect to the vehicle body structure and located adjacent the roof panel and which is lengthwise extensible toward and collapsible away from the aforesaid pivotal axis, (2) at least one head rest member supported on the head rest support frame of the second head rest assembly, the head rest assembly being rockable about the aforesaid pivotal axis between a predetermined uppermost angular position having the head rest member positioned close to the underside of the roof panel and a predetermined lowermost angular position having the head rest member positioned adjacent the head portion of an occupant of the second wheelchair carrying vehicle, (3) a lock-unlock unit securely held in position adjacent the aforesaid pivotal axis and comprising a lock control lever rockable about the pivotal axis and securely connected to the head rest support frame of the second head rest assembly, the lock-unlock unit of the second head rest assembly being operable for having the lock control lever selectively locked to and unlocked from the vehicle body structure; and (4) manually-operated lock-unlock control means operatively connected to the lock-unlock unit of the second head rest assembly for having the lock control lever locked to or unlocked from the vehicle body structure.

BRIEF DESCRIPTION OF THE DRAWINGS

Drawbacks of a prior-art wheelchair carrying vehicle and the features and advantages of a wheelchair carrying vehicle according to the present invention will be understood more clearly from the following description taken in conjunction with the accompanying drawings, in which like reference numerals designate similar or corresponding units, members and structures, and in which.

DESCRIPTION OF THE PRIOR ART

Figure 4:
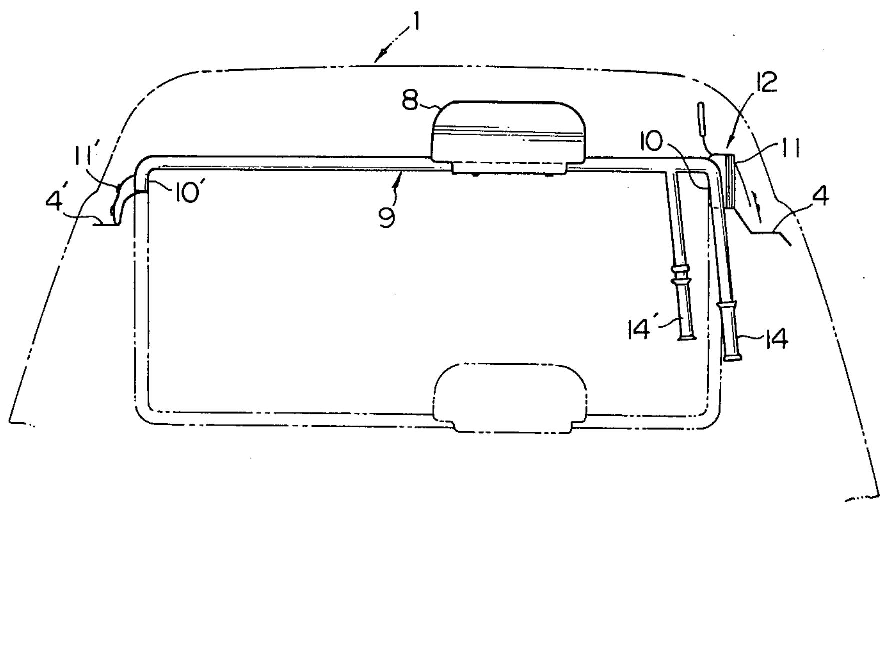
FIG. 4 PRIOR ART
FIG. 4 is a rear end view of the head rest assembly shown in FIGS. 2 and 3.

Referring to FIGS. 1 to 4 of the drawings, a prior-art wheelchair carrying vehicle 1 of the nature to which the present invention appertains is shown as being of the station-wagon type. The wheelchair carrying vehicle 1 has a body structure including a floor panel 2, an inner roof panel 3 and a pair of inner side wall portions 4 and 4' (FIG. 4). The floor panel 2 has a rear end portion 2*a* arranged to be suitable for having supported thereon a wheelchair 5 to be carried by the vehicle 1. When the wheelchair 5 is in use on the rear end portion 2*a* of the floor panel 2, the wheelchair 5 is usually occupied by an invalid or handicapped person 6.

The wheelchair carrying vehicle 1 is equipped with a head rest assembly 7 comprises a head rest pad 8 and a generally U-shaped head rest support frame 9. The head rest support frame 9 has a middle portion having the head rest pad 8 securely mounted thereon and a pair of side arm portions 10 and 10' pivotally connected at their leading ends to the inner side wall portions 4 and 4', respectively, of the vehicle body structure by means of bracket members 11 and 11'. More specifically, one side arm portion 10 of the head rest support frame 9 is pivotally connected at its leading end to the bracket member 11 by means of a lock-unlock unit 12 securely attached to the bracket member 11 and the other side arm portion 10' of the frame 9 is pivotally connected at its leading end directly to the bracket member 11' as will be best seen from FIG. 2. The head rest support frame 9 is thus angularly movable with respect to the vehicle body structure and accordingly to the wheelchair 5 and the occupant 6 of the wheelchair 5 about the pivoted leading ends of the frame 9 between a predetermined upper limit position having the head rest pad 8 located close to the roof panel 3 as indicated by dot-and-dash lines in FIG. 1 and by full lines in FIGS. 3 and 4 and a predetermined lower limit position having the head rest pad 8 located immediately at the rear of the occupant's head as indicated by full lines in FIGS. 1 and 2 and by dot-and-dash lines in FIGS. 3 and 4. The lock-unlock unit 12 is adapted to have the head rest support frame 9 locked in a desired angular position between these two limit angular positions thereof. The head rest support frame 9 is manully moved between the two angular positions by manipulating a rear operating lever 13 mounted on a branch arm 14 projecting downwardly from the rear end of the side arm portion 10 thereof or a front operating lever 13' mounted on a branch arm 14' projecting downwardly from the vicinity of the leading end of the arm portion 10. The rear and front operating levers 13 and 13' are connected to the lock-unclock unit 12 by sheathed flexible wires 15 and 15', respectively.

Figure 1:
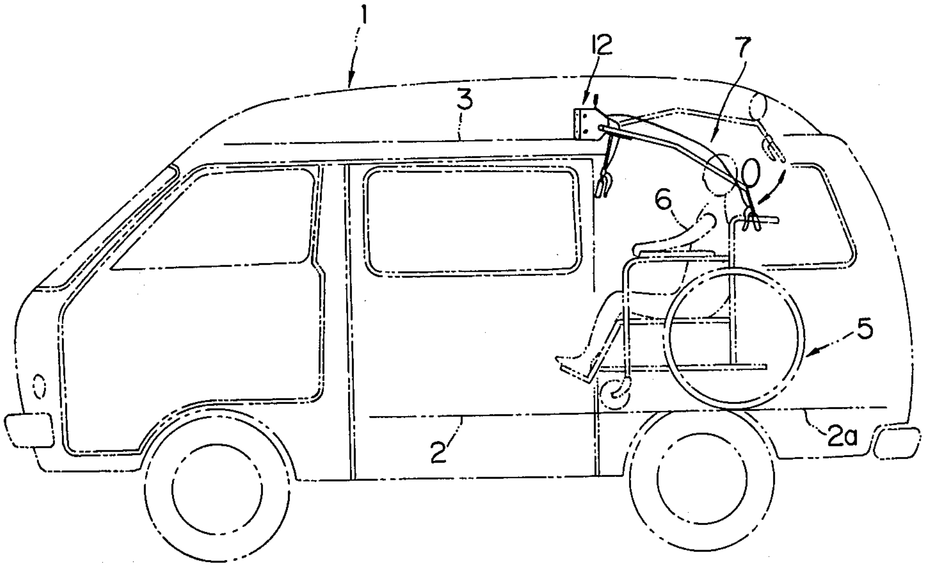
FIG.1 PRIOR ART
FIG. 1 is a schematic side elevation view showing a representative example of a prior-art wheelchair carrying vehicle.
Figure 2:
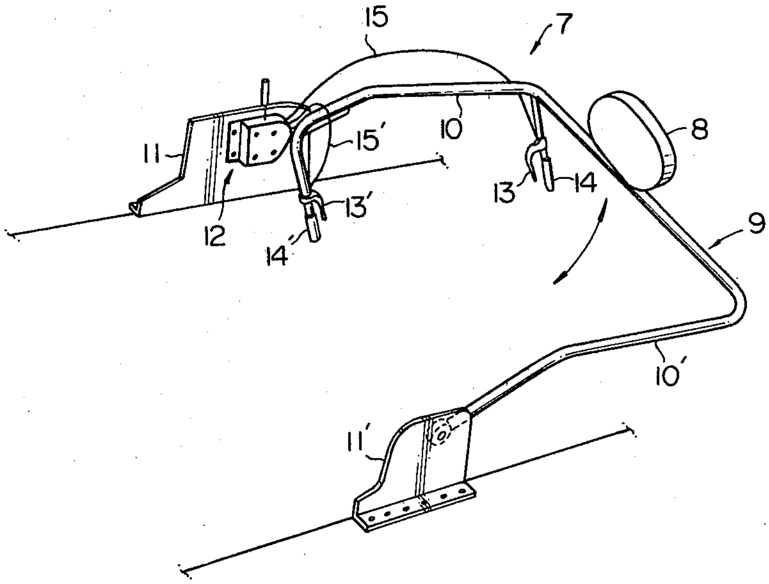
FIG. 2 PRIOR ART
FIG. 2 is a perspective view of a head rest assembly installed on the conventional wheelchair carrying vehicle illustrated in FIG. 1.
Figure 3:
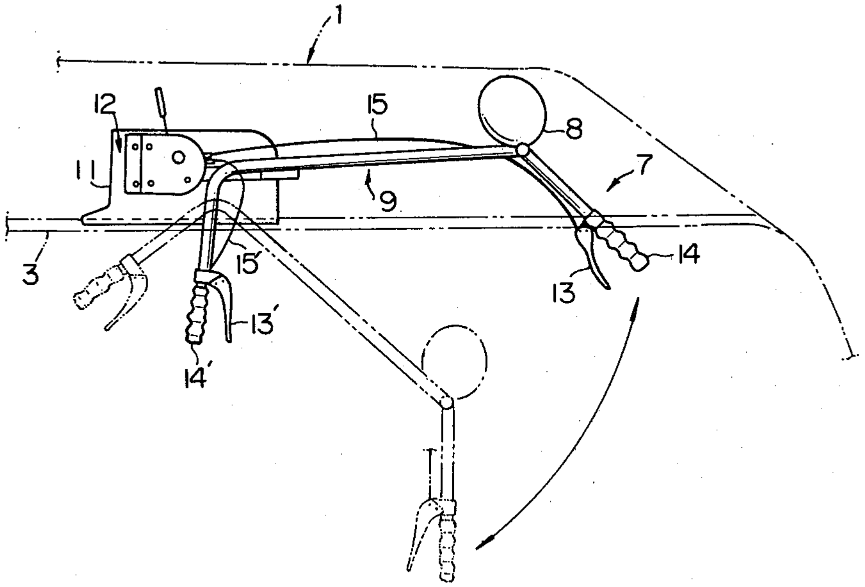
FIG. 3 PRIOR ART
FIG. 3 is a side elevation view of the head rest assembly illustrated in FIG. 2.

When the wheelchair 5 is loaded in the wheelchair carrying vehicle 1 having the head rest assembly 7 thus constructed and arranged as above described, the wheelchair 5 is held in a predetermined position on the rear end portion 2*a* of the floor panel 2. The head rest pad 8 on the support frame 9 is thus held in a certain position with respect to the head of the wheelchair occupant 6 with the head rest support frame 9 locked in a desired angular position between the predetermined upper and lower limit angular positions thereof, enabling the occupant 6 of the wheelchair 5 to have his or her head received on the front face of the head rest pad 8 at the rear of the head, as indicated in FIG. 1.

One of the important problems encountered in a prior-art wheelchair loading mechanism of the above described nature is that the head rest support frame 9 has a fixed turning radius about the leading ends of its side arm portions 10 and 10' so that the position of the head rest pad 8 can not be varied or adjusted to accurately fit the occupant's head. This problem is serious particularly for wheelchair users disabled from holding their heads upright for themselves.

Another important problem of the prior-art wheelchair loading mechanism is that a sufficiently ample space is required at the rear of the head rest assembly 7 for enabling an assistant to the wheelchair occupant 6 to manipulate the rear operating lever 13 from behind the wheelchair occupant 6 without obstructing the angular movement of the head rest support frame 9. A disproportionately ample space being thus required at the rear of the head rest assembly 7, the wheelchair carrying vehicle 1 is not capable of having accommodated therein two or more wheelchairs arranged in a fore-and-aft direction of the vehicle 1.

The present invention contemplates provision of solutions to these problems which have been encountered in wheelchair carrying vehicles using prior-art wheel chair loading mechanisms of the described general character.

DESCRIPTION OF THE PREFERRED EMBODIMENTS

Figure 5:
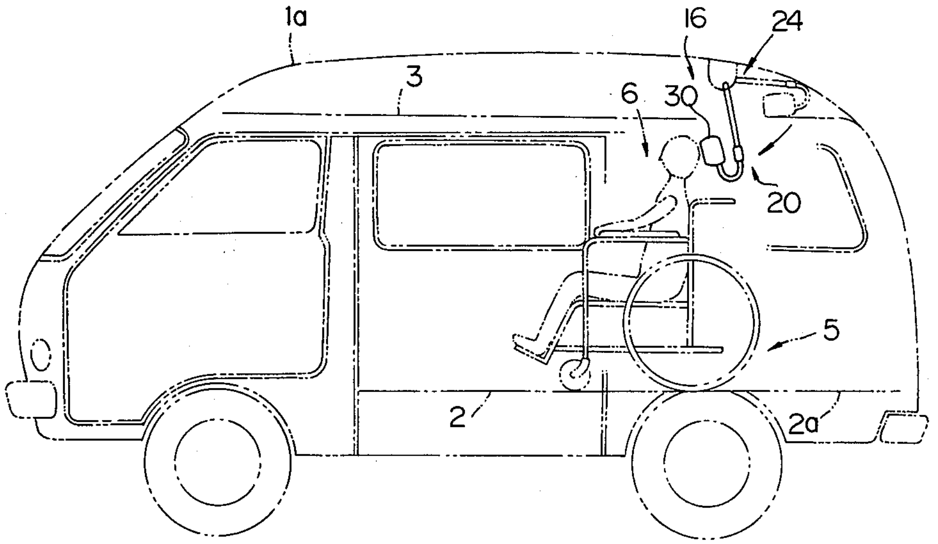
FIG. 5 is a schematic side elevation view showing a first preferred embodiment of a wheelchair carrying vehicle according to the present invention.
Figure 6:
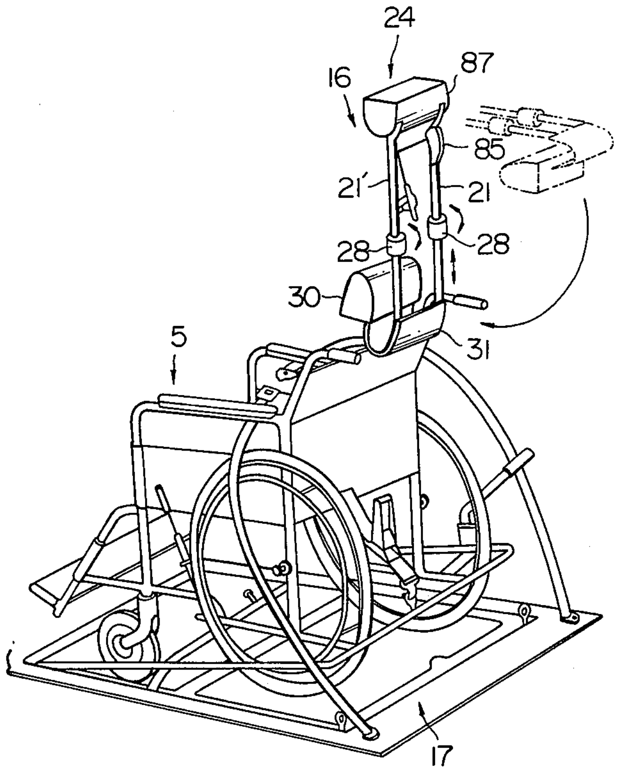
FIG. 6 is a perspective view showing the arrangement in which a wheelchair and a head rest assembly are installed in the wheelchair vehicle illustrated in FIG. 5.

Referring to FIG. 5 of the drawings, a wheelchair carrying vehicle 1*a* constituting a first preferred embodiment of the present invention as represented in its entirety by reference numeral 16 is also shown by way of example as being of the station-wagon type having a body structure including a horizontal floor panel 2, and a horizontal inner roof panel 3. The floor panel 2 has a rear end portion 2*a* arranged to be suitable for having supported thereon a wheelchair 5 to be carried by the vehicle. When the wheelchair 5 is in use on the rear end portion 2*a* of the floor panel 2, the wheelchair 5 is usually occupied by an invalid or handicapped person 6 with his or her head facing forward as shown in FIG. 5. The wheelchair carrying vehicle has a wheelchair support base structure 17 fixedly positioned on the rear end portion 2*a* of the floor panel 2 as shown in FIG. 6.

The head rest assembly 16 of the wheelchair carrying vehicle 1*a* embodying the present invention comprises a stationary bracket member 18 bolted or otherwise securely attached to the underside of the roof panel 3. The bracket member 18 has a pair of side end portions 19 and 19' spaced apart in parallel from each other in a lateral direction of the vehicle body structure and projecting downwardly toward the floor panel 2. The head rest assembly 16 further comprises a head rest support frame 20 having a pair of side posts 21 and 21' spaced apart in parallel from each other in a lateral direction of the vehicle body structure as will be better seen from FIG. 7 of the drawings. The head rest support frame 20 further has upper and lower reinforcement beams 22 and 23 bridging upper and lower end portions, respectively, of the side posts 21 and 21'. One of the side posts such as the side post 21 as shown is pivotally connected at its upper end to one side end portion 19 of the bracket member 18 by means of a lock-unlock unit 24 and the other of the side posts such as the side post 21' as shown is pivotally connected to the other side end portion 19' of the bracket member 18 by a pivot pin 25 having a horizontal center axis aligned with the axis about which the side post 21 is rotatable with respect to the lock-unlock unit 24.

Figure 8:
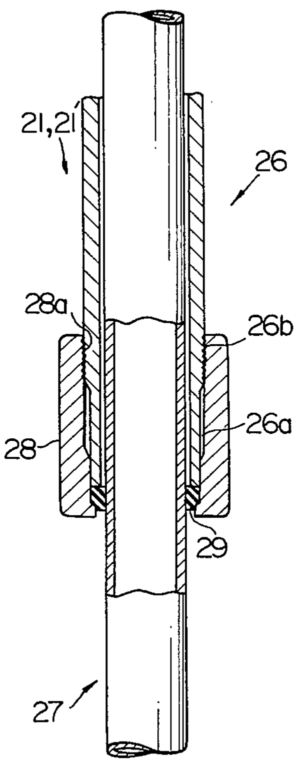
FIG. 8 is a longitudinal sectional view showing the construction of one of the side posts forming part of a head rest support frame of the head rest assembly shown in FIG. 7.

Each of the side posts 21 and 21' of the head rest support frame 20 is composed of upper and lower tubular segments 26 and 27 which are telescopically joined together and an externally knurled locking sleeve 28 as shown in FIG. 8 of the drawings. More specifically, one of the two tubular segments such as the upper tubular segment 26 has a downwardly tapered lower end portion 26*a* and an externally threaded axial portion 26*b* adjacent the tapered lower end portion 26*a* and has the other of the segments such as the lower tubular segment 27 axially inserted upwardly into the upper tubular segment 26. The locking sleeve 28 has an internally threaded upper end portion 28*a* engaged by the externally threaded axial portion 26*b* of the upper tubular segment 26 with an annular bushing 29 of an elastic material such as rubber closely interposed between the outer peripheral surface of the lower tubular segment 27 and the inner peripheral surface of a lower end portion of the locking sleeve 28. The upper and lower tubular segments 26 and 27 are thus secured together by means of the locking sleeve 28 and the bushing 29 when the locking sleeve 28 is tightly screwed to the threaded axial portion 26*b* of the upper tubular segment 26. The upper and lower tubular segments 26 and 27 can be axially moved with respect to each other when the locking sleeve 28 is loosened from the threaded axial portion 26*b* of the upper tubular segment 26. The respective lower tubular segments 27 of the two side posts 21 and 21' are rigidly connected together by the lower reinforcement beam 23. Thus, the two side posts 21 and 21' can be axially extended or shortened simultaneously when the locking sleeves 28 on the tubular segments 27 of the side posts 21 and 21' are loosened from the respective threaded axial portions 26*b* of the upper tubular segments 26 of the side posts 21 and 21'.

Figure 7:
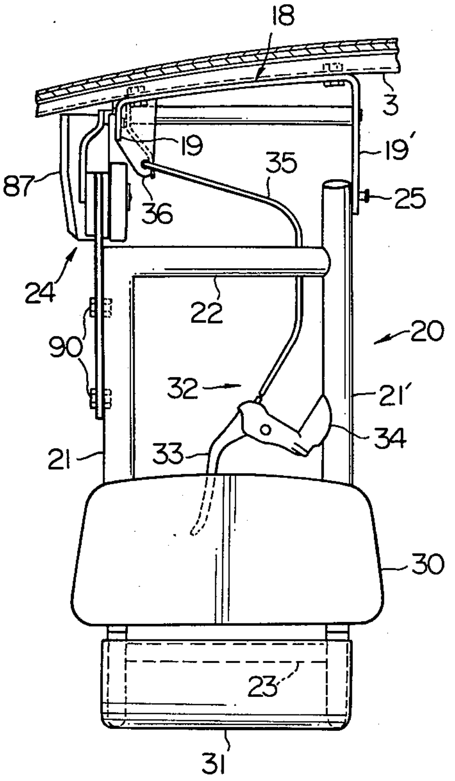
FIG. 7 is a front end view of the head rest assembly in the first preferred embodiment of the present invention.
Figure 9:
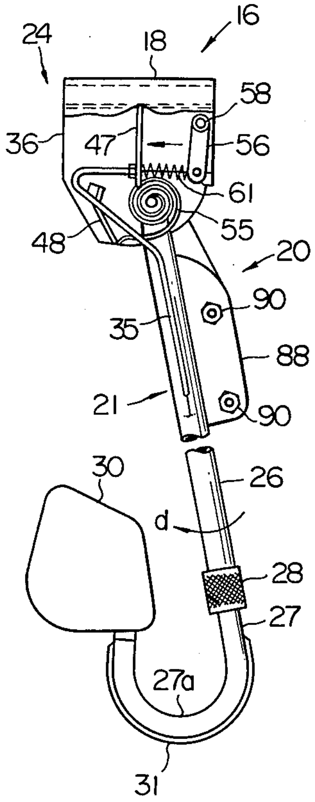
FIG. 9 is a side elevation view of the head rest assembly illustrated in FIG. 7.

The lower tubular segments 27 of the side posts 21 and 21' have semicircularly curved lower end portions 27*a* turned back upwardly and have a head rest pad 30 secured to the tubular segments 27 at the upwardly directed leading ends of the segments 27 as will be best seen from FIG. 9 of the drawings. The head rest assembly 16 of the vehicle 1*a* embodying the present invention further comprises a head rest web 31 securely attached to the curved lower end portions 27*a* of the tubular segments as shown in FIGS. 7 and 9. The head rest pad 30 and the head rest sheet 31 supported on the head rest support frame 20 as above described serve as main and auxiliary head rest members, respectively, in the head rest assembly 16. The head rest pad 30 thus serving as the main head rest member may be constituted by an ordinary head rest pad used in a prior-art head rest assembly of a wheelchair carrying vehicle such as the head rest pad used in the priorart wheelchair carrying vehicle shown in FIG. 1. The head rest support frame 20 constructed and arranged as hereinbefore described is rockable in its entirety about a horizontal axis aligned with the center axis of the pivot pin 25 (FIG. 7) between an approximately horizontal predetermined upper angular position close to the inner roof panel 3 of the vehicle body structure as indicated by dot-and-dash lines in FIGS. 5 and 6 and an approximately vertical predetermined lower angular position operative to have the head of the wheelchair occupant 6 received on the front face of the head rest pad 30 as indicated by full lines in FIGS. 5 and 6.

As will be best seen from FIG. 7, the head rest assembly 16 in the wheelchair carrying vehicle embodying the present invention further comprises manually operated lock-unlock control means 32 comprising an operating lever 33 pivotally mounted on a bracket member 34 which is securely connected to a suitable portion of the head rest support frame 20 such as the upper tubular segment 26 of the side post 21' of the head rest support frame 20. The operating lever 33 is operatively connected by a sheathed flexible wire 35 to the previously mentioned lock-unlock unit 24.

Figure 10:
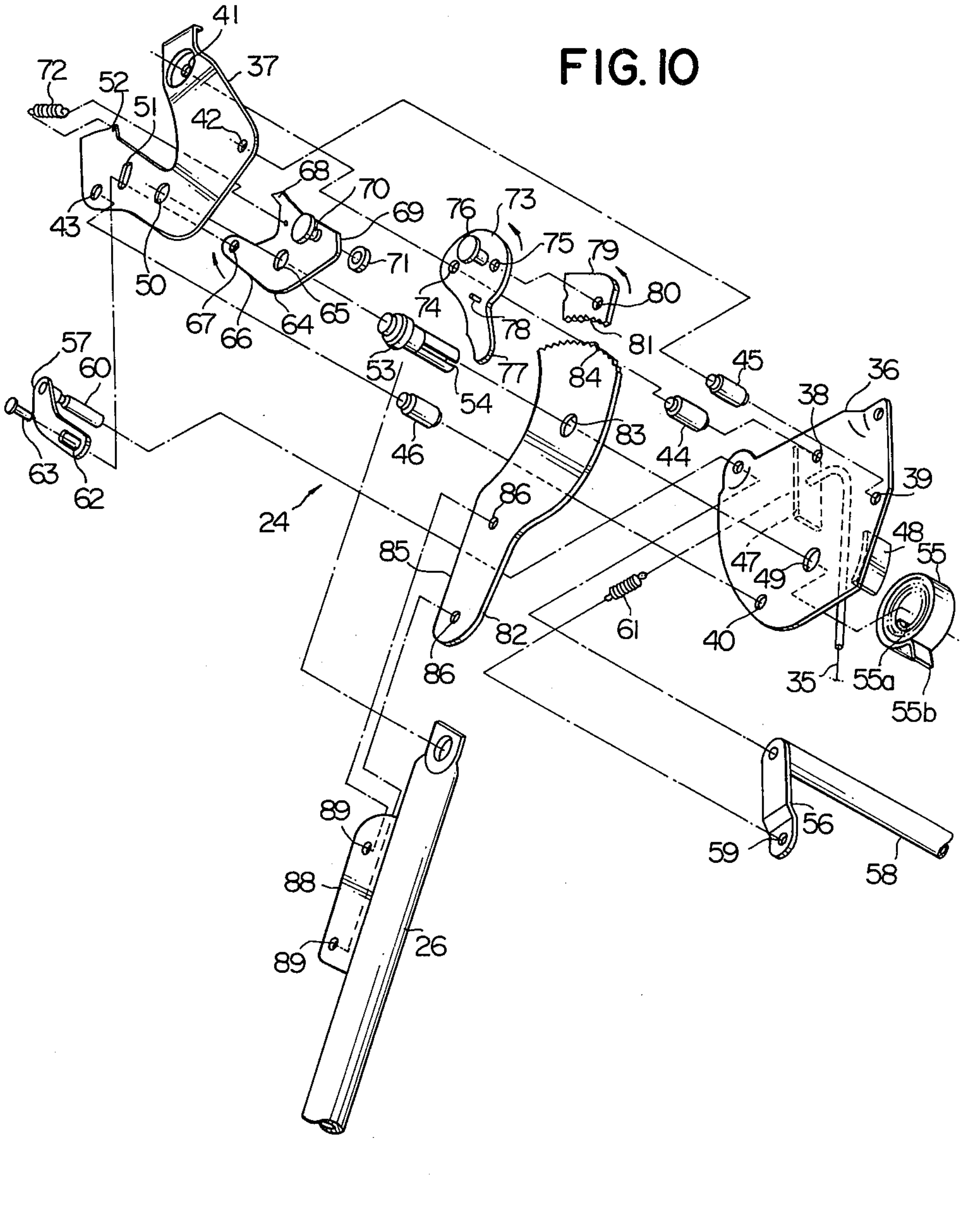
FIG. 10 is an exploded perspective view of a lock-unlock unit forming part of the head rest assembly in the first preferred embodiment of the present invention.
Figure 11:
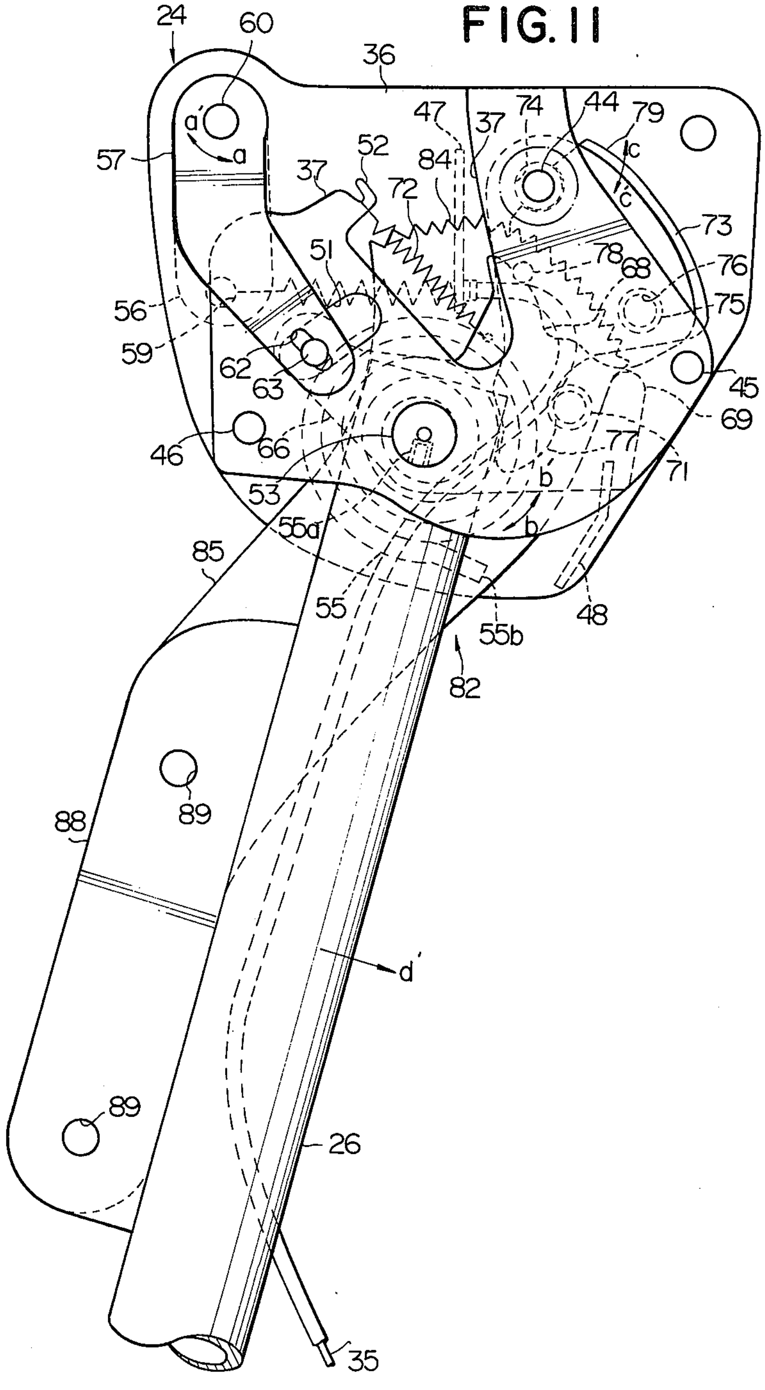
FIG. 11 is a side end view of the lock-unlock unit illustrated in FIG. 10.

Turning to FIGS. 10 and 11 of the drawings, the lock-unlock unit 24 comprises first and second stationary support members which are respectively constituted by a base plate 36 and a holder plate 37. The base plate 36 is securely attached to the roof panel 3 (FIGS. 5 and 7) of the vehicle body structure by means of the previously mentioned bracket member 18 (FIGS. 7 and 9) and is formed with circular holes 38, 39 and 40. The holder plate 37 is spaced apart in parallel from the base plate 36 in a lateral direction of the vehicle body structure as will be seen from FIG. 7 and is formed with circular holes 41, 42 and 43 located in alignment with the holes 38, 39 and 40, respectively, in the base plate 36. The base plate 36 and holder plate 37 are securely coupled together by means of first, second and third spacer pins 44, 45 and 46 axially projecting each at one end thereof into the holes 38, 39 and 40, respectively, in the base plate 36 and at the other ends thereof into the holes 41, 42 and 43, respectively, in the holder plate 37. The base plate 36 has a wire retaining member 47 securely attached to or integral with the outer face of the base plate 36, and a spring stop member 48 also securely attached to or integral with the outer face of the base plate 36. The flexible sheathed wire 35 forming part of the above mentioned lock-unlock control means 32 is retained to the wire retaining member 47 and has a leading end portion movably projecting therethrough. The base plate 36 is further formed with a main circular hole 49 located in the vicinity of the spring stop member 48. On the other hand, the holder plate 37 is further formed with a main circular hole 50 aligned with the main circular hole 49 in the base plate 36, an elongated guide slot 51 and a hook portion 52 as shown. An intermediately flanged pivot shaft 53 is rotatably received in the respective main circular holes 49 and 50 in the base plate 36 and holder plate 37 and has a stem portion axially projecting outwardly from the hole 49 in the base plate 36. The stem portion of the pivot shaft 53 is formed with an axial groove 54 and has coaxially mounted thereon a spiral torsion spring 55 which is disposed outside the base plate 36. The torsion spring 55 has an inner end portion 55*a*, which is bent radially inwardly and which is securely fitted in the axial groove 54, and an outer end portion 55*b* which is bent radially outwardly. The respective main circular slots 49 and 50 in the base plate 36 and holder plate 37 and accordingly the pivot shaft 53 rotatable therein have respective center axes aligned with the center axis of the previously mentioned pivot pin 25 on the bracket member 18.

The lock-unlock unit 24 of the head rest assembly 16 of the vehicle 1*a* embodying the present invention further comprises first and second rocking arms 56 and 57 disposed on the outer faces of the base plate 36 and holder plate 37, respectively. The first rocking arm 56 has one end portion securely connected on a shaft 58 and is formed with a hole 59 in the other end portion thereof. On the other hand, the second rocking arm 57 has one end portion fixedly connected to the above mentioned shaft 58 by means of a connecting pin 60 axially passed through the circular hole in the base plate 36 and securely inserted into the shaft 58 through the first rocking arm 56. The first rocking arm 56 and second rocking arm 57 and the connecting pin 60 are, thus, rotatable together about the center axis of the connecting pin 60 with respect to the base plate 36 and holder plate 37. A preloaded helical tension spring 61 is anchored at one end thereof to the first rocking arm 56 through the hole 59 therein and at the other end thereof to a leading end portion of the wire 35 forming part of the lock-unlock control means 32 (FIG. 7). Thus, the helical tension spring 61 constitutes biasing means urging the first and second rocking arms 56 and 57 to turn clockwise in FIG. 11 about the center axis of the connecting pin 60 and further urging the wire 35 to endwise move toward the lock-unlock unit 24 away from the operating lever 33 of the lock-unlock control means 32 (FIG. 7). The second rocking arm 57 is formed with an elongated guide slot 62 located adjacent the elongated guide slot 51 in the holder plate 37 as will be seen from FIG. 10. A coupling pin 63 is axially passed through the guide slot 62 in the second rocking arm 57 and the guide slot 51 in the holder plate 37 and is securely connected at its leading end to a cam plate 64.

The cam plate 64 is disposed between the base plate 36 and holder plate 37 and has a central portion formed with a main circular hole 65 aligned with the respective main circular holes 49 and 50 in the base plate 36 and holder plate 37. The pivot shaft 53 axially extending between the base plate 36 and holder plate 37 is passed through the main circular hole 65 in the cam plate 64, which is thus rotatable about the center axis of the pivot shaft 53 with respect to the base plate 36 and holder plate 37. The cam plate 64 further has an arm portion 66 formed with a hole 67 and located adjacent the elongated guide slot 51 in the holder plate 37, a cam lobe portion 68 projecting away from the center portion of the cam plate 64 and angularly spaced apart from the arm portion 66, and a carrier portion 69 protruding from the central portion of the cam plate 64 in generally diametrically opposite relationship to the arm portion 66. The coupling pin 63 axially passed through the respective guide slots 51 and 62 in the base plate 36 and second rocking arm 57 is fixedly connected at its leading end to the arm portion 66 of the cam plate 64 through the above mentioned hole 67 in the arm portion 66. The rotation of the first and second rocking arms 56 and 57 about the center axis of the connecting pin 60 is thus transmitted through the coupling pin 63 to the cam plate 64 and causes the cam plate 64 to turn in either direction about the center axis of the pivot shaft 53 depending upon the direction of rotation of the rocking arms 56 and 57. On the carrier portion 69 of the cam plate 64 is mounted a roller support pin 70 having a roller 71 rotatably supported thereon, the axis of rotation of the roller 71 being parallel with the center axis of the pivot shaft 53. A preloaded helical tension spring 72 is anchored at one end thereof to a suitable portion such as the cam portion 68 of the cam plate 64 and at the other end thereof to the hook portion 52 of the holder plate 37 as shown. The tension spring 72 thus arranged constitutes biasing means serving to urge the cam plate 64 to turn counterclockwise in FIG. 11 about the center axis of the pivot shaft 53.

The lock-unlock unit 24 further comprises a cam follower plate 73 disposed in part between the cam plate 64 and the base plate 36 and has an upper end portion formed with a main circular hole 74 aligned with the circular hole 38 in the base plate 36 and the circular hole 41 in the holder plate 37. The first spacer pin 44 extending between these holes 38 and 41 in the base plate 36 and holder plate 37 is axially passed through the main circular hole 74 in the cam follower plate 73 so that the cam follower plate 73 is rotatable about the center axis of the spacer pin 44 with respect to the base plate 36 and holder plate 37 and further to the cam plate 64. The cam follower plate 73 is further formed with a circular hole 75 through which a connecting pin 76 is secured to the cam follower plate 73 and axially extends toward the inner face of the base plate 36. The cam follower plate 73 further has a lower ramp portion 77 protruding downwardly from the spacer pin 44. The ramp portion 77 of the cam follower plate 73 is adapted to be engaged by the roller 71 on the cam plate 64 as will be understood more clearly as the description proceeds. The cam follower plate 73 has fixedly mounted on its central portion a cam follower pin 78 to be engaged by the cam portion 68 of the cam plate 64 as will also be understood as the description proceeds. The above mentioned biasing means constituted by the helical tension spring 72 is effective to urge the cam plate 64 to turn about the center axis of the pivot shaft 53 in a direction to hold the cam portion 68 of the cam plate 64 disengaged from the cam follower pin 78 on the cam follower plate 73.

The lock-unlock unit 24 further comprises a toothed lock plate 79 which is disposed between the base plate 36 and the above described cam follower plate 73 and which is formed with a circular hole 80 aligned with the circular hole 75 in the cam follower plate 73. The connecting pin 76 passed through the hole 75 in the cam follower plate 73 is secured to the toothed lock plate 79 through the hole 80 thus formed therein. The toothed lock plate 79 is thus rotatable together with the cam follower plate 73 with respect to the base plate 36 and holder plate 37 and the cam plate 64 about the center axis of the first spacer pin 44 passed through the circular hole 74 in the cam follower plate 73. The toothed lock plate 79 has a lower toothed edge portion 81 which is in its entirety arcuately curved inwardly toward the center axis of the circular hole 80. The toothed lock plate 79 is further formed with a semicircular recess having the spacer pin 44 slidably received therein as will be seen from FIG. 11.

The lock-unlock unit 24 further comprises a toothed lock control lever 82 which is also disposed in part between the base plate 36 and the cam follower plate 73 and which has an intermediate fulcrum portion formed with a circular hole 83, an upper toothed edge portion 84 and a lower arm portion 85 extending downwardly from the intermediate fulcrum portion and formed with a suitable number of holes 86. The pivot shaft 53 passed through the main circular hole 65 in the cam plate 64 as previously described is securely passed through the circular hole 83 so that the toothed lock control lever 82 is rotatable with the pivot shaft 53 with respect to the base plate 36, holder plate 37, cam plate 64, cam follower plate 73 and toothed lock plate 79 about the center axis of the pivot shaft 53. The upper toothed edge portion 84 of the toothed lock control lever 82 is in its entirety arcuately curved outwardly about the center axis of the pivot shaft 53 and is engageable with the toothed edge portion 81 of the toothed lock plate 79. The toothed lock plate 79 is, thus, rotatable about the center axis of the first spacer pin 44 between a first angular position held in mesh with the upper toothed edge portion 84 of the toothed lock control lever 82 and a second angular position angularly spaced apart and accordingly disengaged from the toothed edge portion 84 of the toothed lock control lever 82. The lower toothed edge portion 81 of the toothed lock plate 79 is curved in its entirety about an axis which is parallel with the center axis of the pivot shaft 53 when the toothed lock plate 79 is held in the first angular position thereof. The individual component members of the lock-unlock unit 24 thus constructed and arranged are encased within a housing 87 as shown in FIG. 6.

The lower arm portion 85 of the toothed lock control lever 82 projects downwardly from the housing 87 and is securely connected to the side post 21 of the previously described head rest support frame 20 by means of a support member 88 formed with holes 89. The support member 88 is secured to or integral with the upper tubular segment 26 (FIG. 8) of the side post 21 and is rigidly connected to the lower arm portion 85 of the toothed lock control lever 82 by suitable fastening elements such as bolts 90 (FIG. 7) passed through the holes 86 in the toothed lock control lever 82 and the holes 89 in the support member 89.

Description will be hereinafter made with concurrent reference to FIGS. 5 to 11 in regard to the manners in which the position of the head rest pad 30 of the head rest assembly 16 of the wheelchair carrying vehicle 1*a* embodying the present invention is to be varied or adjusted with respect to the head of the occupant 6 (FIG. 5) of the wheelchair 5.

When the wheelchair 5 occupied with, for example, an invalid or handicapped person 6 is conveyed into the wheelchair carrying vehicle 1*a* and is positioned on the wheelchair support base structure 17 as shown in FIG. 6, the head rest support frame 20 as a whole is held in the previously memtioned predetermined upper angular position close to the underside of the inner roof panel 3 of the vehicle body structure as indicated by the dot-and-dash lines in FIGS. 5 and 6. If the operating lever 33 of the lock-unlock control means 32 (FIG. 7) is actuated under these conditions by, for example, an assistant to the wheelchair occupant 6, the wire 35 leading from the lever 33 to the wire retaining member 47 on the base plate 36 of the lock-unlock unit 24 is endwise pulled toward the bracket member 34 of the lock-unlock control means 32 against the force of the helical tension spring 61 to which the wire 35 is tied at its leading end. The force thus imparted to the wire 35 is transmitted through the spring 61 to the first rocking arm 56 and thereby causes the first rocking arm 56 and accordingly the second rocking arm 57 to turn counterclockwise in FIGS. 10 and 11, viz., in a direction indicated by arrow a in FIG. 11 about the center axis of the connecting pin 60 with respect to the base plate 36 and holder plate 37. The turning motion of the second rocking arm 57 is transmitted through the coupling pin 63 to the cam plate 64, which is accordingly caused to turn clockwise in FIGS. 10 and 11, viz., in a direction indicated by arrow b in FIG. 11 about the center axis of the pivot shaft 53 with respect to the base plate 36 and holder plate 37 against the force of the helical tension spring 72. In this instance, the coupling pin 63 is permitted to move with respect to the holder plate 37 and the second rocking arm 57 through the guide slot 51 in the base plate 36 and the guide slot 62 in the second rocking arm 57. The turning motion of the cam plate 64 in turn is transmitted through the cam follower pin 78 to the cam follower plate 73 and causes the cam follower plate 73 to turn counterclockwise in FIGS. 10 and 11, viz., in a direction indicated by arrow c in FIG. 11 around the first spacer pin 44 between the base plate 36 and holder plate 37 with respect to the base plate 36 and holder plate 37. When the cam plate 64 and accordingly the cam follower plate 73 are thus making turns about the respective center axes of the pivot shaft 53 and the spacer pin 44, the roller 71 carried on the cam plate 64 is disengaged from the lower ramp portion 77 of the cam follower plate 73. The turning motion of the cam follower plate 73 in the direction of the arrow c is transmitted through the connecting pin 76 to the toothed lock plate 79 and is followed by turning motion of the toothed lock plate 79 in the same direction about the center axis of the spacer pin 44 with respect to the base plate 36 and holder plate 37 and accordingly to the toothed lock control lever 82 which is still held stationary with respect to the base plate 36 and holder plate 37. The toothed lock plate 79 is thus caused to turn in the direction of the arrow c from the first angular position to the second angular position with respect to the toothed lock control lever 82 so that the lower toothed edge portion 81 of the toothed lock plate 79 is disengaged from the upper toothed edge portion 84 of the toothed lock control lever 82, making the toothed lock control lever 82 free to turn in either direction about the center axis of the pivot shaft 53.

If the head rest support frame 20 as a whole is then manually turned with respect to the vehicle body structure about the horizontal axis aligned with the center axis of the pivot pin 25 (FIG. 7) by, for example, the assistant to the occupant 6 of the wheelchair 5 in, for example, a direction indicated by arrow d in FIG. 9, then the toothed lock control lever 82 is also turned about the center axis of the pivot shaft 53 in a direction indicated by d' in FIG. 11 with respect to the base plate 36 and holder plate 37. As a result of the turning motion of the toothed lock control lever 82 in the direction of the arrow d', the spiral torsion spring 55 mounted on the pivot shaft 53 is also caused to turn with respect to the base plate 36 and is ultimately brought into abutting engagement at its outermost end portion **55*b* with the spring stop member 48 on the base plate 36. As the toothed lock control lever 82 is further turned in the direction of the arrow d' with respect to the base plate 36, the manipulative effort applied to the head rest support frame 20 by, for example, the assistant to the wheelchair occupant 6 is elastically resisted by the spiral torsion spring 55 so that the head rest support frame 20 and accordingly the head rest pad 30 of the head rest assembly 16 are softly and accurately moved into desired positions with respect to the occupant 6 of the wheelchair 5. The head rest pad 30 of the head rest assembly 16 in the wheelchair carrying vehicle 1*a* embodying the present invention can be in these manners moved into a desired angular position with respect to the head of the wheelchair occupant 6**.

After the head rest pad 30 is thus moved into the desired angular position with respect to thr wheelchair occupant's head, the operating lever 33 of the lock-unlock control means 32 (FIG. 7) is released from the manipulative effort which has been applied thereto. The wire 35 is now released from the pull from the lever 34 and is allowed to restore its initial condition by the force of the helical tension spring 61 (FIGS. 10 and 11). It therefore follows that the first rocking arm 56 and accordingly the second rocking arm 57 of the lock-unlock unit 24 are caused to turn clockwise, viz., in a direction indicated by arrow a' in FIG. 11 about the center axis of the connecting pin 60 by the force of the tension spring 61 and, in turn, allows the cam plate 64 to be turned clockwise in FIG. 11, viz., in a direction indicated by arrow b' about the center axis of the pivot shaft 53 by the force of the helical tension spring 72. As the cam plate 64 is thus turned in the direction of the arrow b', the roller 71 carried thereon by means of the roller carrier pin 76 is brought into rolling engagement with the lower ramp portion 77 of the cam follower plate 73 and forces the cam follower plate 73 to turn clockwise in FIG. 11, viz., in a direction indicated by arrow c' about the center axis of the first spacer pin 44. This causes the toothed lock plate 79 to turn also in the direction of the arrow c' about the center axis of the spacer pin 44 and to be thereby moved into the initial first angular position having the lower toothed edge portion 81 held in mating engagement with the upper toothed edge portion 84 of the toothed lock control lever 82. The toothed lock control lever 82 on the head rest support frame 20 which has been position adjusted as described before is in this manner for a second time locked by the toothed lock plate 79, with the result that the head rest pad 30 (FIGS. 7 and 9) is held in a desired angular position with respect to the head of the wheelchair occupant 6.

If it is desired to vary not only the angular position but also the vertical position of the head rest pad 30 with respect to the wheelchair occupant's head, the locking sleeve 28 on the upper tubular segment 26 (FIG. 8) of each of the side posts 21 and 21' is loosened from the externally threaded axial portion **26*b* of the segment 26 by, for example, the wheelchair occupant's assistant so as to permit the lower tubular segment 27 of each of the side posts 21 and 21' to telescopically move with respect to the upper tubular segment 26. The lower tubular segments 27 can thus be upwardly moved deeper into or downwardly extended from the upper tubular segments 26 of the side posts 21 and 21' until the head rest pad 30 reaches the desired vertical position with respect to the wheelchair occupant's head. The head rest pad 30 can be held in the particular vertical position by tightening the locking sleeve 28 onto the threaded axial portion 26*b* of the upper tubular segment 26 of each of the side posts 21 and 21'**.

Figure 12:
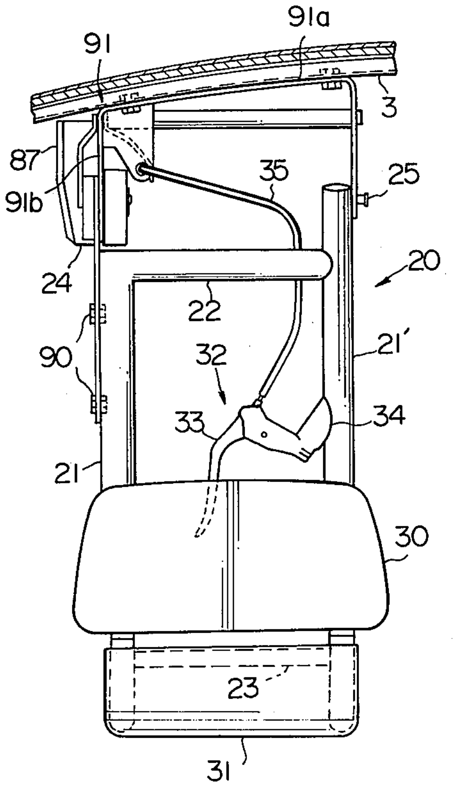
FIG. 12 is a view similar to FIG. 7 but which shows a modification of the head rest assembly incorporated in the first preferred embodiment of the present invention.

While the base plate 36 forming part of the lock-unlock unit 24 in the hereinbefore described head rest assembly 16 of the wheelchair carrying vehicle **1*a* embodying the present invention has been assumed to be secured to the inner roof panel 3 of the vehicle body structure by means of the bracket member 18 (FIGS. 7 and 9), the base plate 36 and the bracket member 18 may be constituted by a single unitary member 91 as shown in FIG. 12 of the drawings. In this instance, the unitary member 91 has an upper bracket portion 91*a* essentially similar in shape to the bracket member 18 of the arrangement shown in FIGS. 7 and 9 securely attached to the underside of the inner roof panel 3 of the vehicle body structure, and a lower base plate portion 91*b* essentially similar in shape to the base plate 36 in the arrangement shown in FIGS. 10 and 11 and forming part of the lock-unlock unit 24**.

Figure 13:
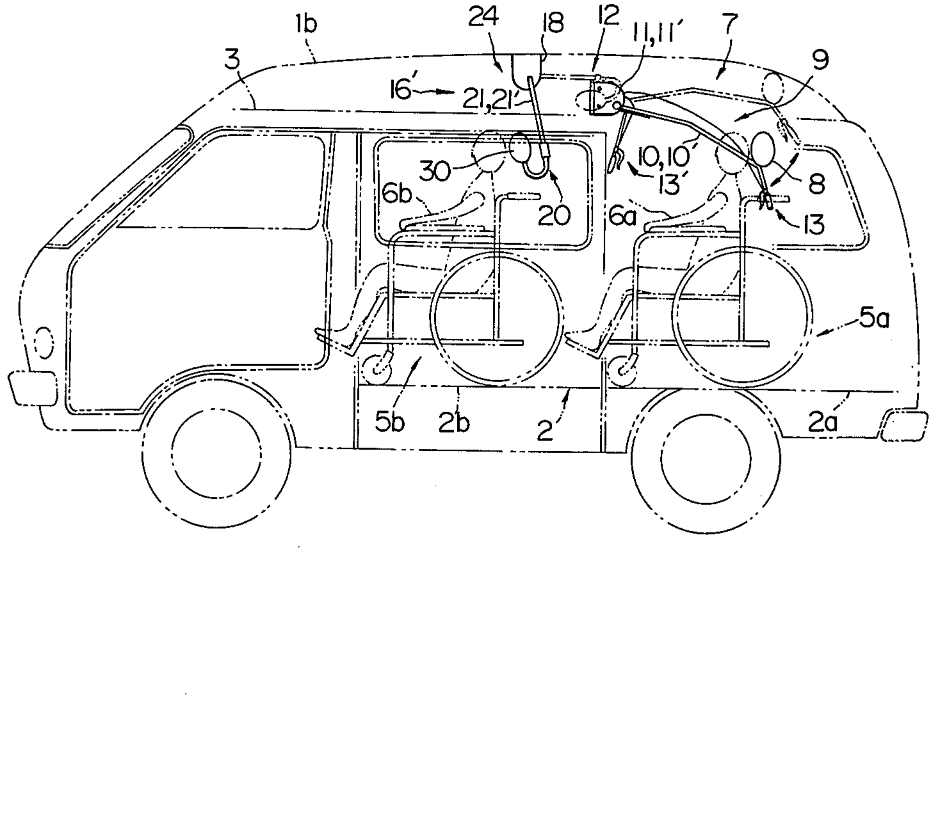
FIG. 13 is a view similar to FIG. 5 but which shows a second preferred embodiment of a wheelchair carrying vehicle according to the present invention.
Figure 14:
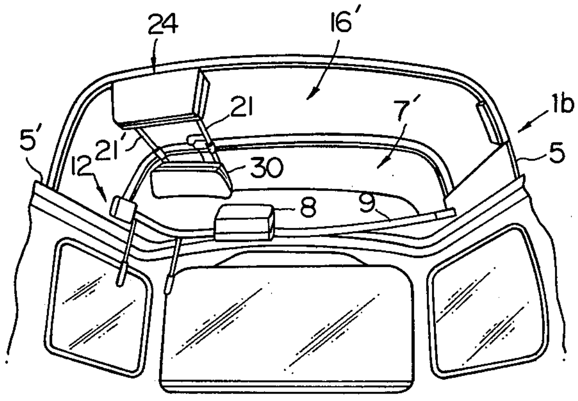
FIG. 14 is a front end view of the arrangement in which two head rest assemblies are installed in the body structure of the wheelchair carrying vehicle shown in FIG. 13.

In FIGS. 13 and 14 of the drawings is shown a wheelchair carrying vehicle 1*b* constituting a second preferred embodiment of the present invention. The wheelchair carrying vehicle 1*b* herein shown is also assumed by way of example as being of the station-wagon type and has a vehicle body structure including a floor panel 2, and an inner roof panel 3. The floor panel 2 has, in a fore-and-aft direction of the vehicle body structure, a rear end portion 2*a* and an intermediate portion 2*b* as shown in FIG. 13. Though not shown in the drawings, the rear end portion 2*a* and the intermediate portion 2*b* of the floor panel 2 have fixedly mounted thereon rear and front wheelchair support base structures, respectively. The wheelchair support base structures thus mounted on the portions 2*a* and 2*b* of the floor panel 2 are similar to the wheelchair support base structure 17 in the arrangement shown in FIG. 6 and are adapted to have supported thereon first and second wheelchairs 5*a* and 5*b*, respectively.

Above the wheelchair support base structures on the rear and intermediate portions 2*a* and 2*b* of the floor panel 2 are provided first and second or rear and front head rest assemblies 7′ and 16′, respectively, which are arranged to serve the occupants 6*a* and 6*b* of the first and second wheelchairs 5*a* and 5*b*, respectively. The rear head rest assembly 7′ per se is constructed similarly to the head rest assembly 7 provided in the previously described prior-art wheelchair carrying vehicle 1 shown in FIG. 1, while the front head rest assembly 16′ per se is constructed similarly to the head rest assembly 16 installed in the embodiment of the wheelchair carrying vehicle 1*a* described with reference to FIGS. 5 to 12.

In the wheelchair carrying vehicle 1*b* shown in FIGS. 13 and 14, the rear head rest assembly 7′ has the side arm portions 10 and 10′ of its head rest support frame 9 pivotally connected at their leading ends to the inner side wall portions, respectively, of the vehicle body structure by means of the bracket members 11 and 11′ with the lock-unlock unit 12 provided between one of the bracket members 11 and 11′ and the associated one of the side wall portions of the vehicle body structure. The head rest support frame 9 is thus angularly movable with respect to the vehicle body structure and accordingly to the wheelchair 5 and the occupant 6*a* of the wheelchair 5 about the pivoted leading ends of the frame 9 between a predetermined upper limit position having the head rest pad 8 located close to a rear end portion of the roof panel 3 and a predetermined lower limit position having the head rest pad 8 located immediately at the rear of the occupant's head. The lock-unlock unit 12 is adapted to have the head rest support frame 9 locked in a desired angular position between these two limit angular positions thereof as in the wheelchair carrying vehicle described with reference to FIGS. 1 to 4. The head rest support frame 9 is manually moved between the two angular positions by manipulating the rear operating lever 13 or the front operating lever 13′.

On the other hand, the front head rest assembly 16′ provided in the wheelchair carrying vehicle 1*b* shown in FIGS. 13 and 14 is positioned in front of the rear head rest assembly 7′ and at the rear of the driver's seat of the vehicle 1*b* and has a stationary bracket member (not shown) otherwise securely attached to the underside of a longitudinally intermediate portion of the roof panel 3. The head rest support frame 20 of the front head rest assembly 16′ also has a pair of side posts 21 and 21′ spaced apart in parallel from each other in a lateral direction of the vehicle body structure. One side post 21 is pivotally connected at its upper end to one side end portion of the bracket member 18 by means of the lock-unlock unit 24 and the other side post 21′ is pivotally connected to the other side end portion of the above mentioned bracket member by a pivot pin. Each of the side posts 21 and 21′ is constructed by two telescopically joined upper and lower tubular segments as previously described with reference to FIG. 8 so that the side posts 21 and 21′ can be axially extended or shortened simultaneously when the locking sleeves 28 on the tubular segments of the side posts 21 and 21′ are loosened from the respective threaded axial portions of the upper tubular segments of the side posts 21 and 21′. The lower tubular segments of the side posts 21 and 21′ have semicircularly curved lower end portions turned back upwardly and have the head rest pad 30 secured to the lower tubular segments at the upwardly directed leading ends of the segments. The head rest assembly 16′ further comprises a head rest web (not shown) securely attached to the curved lower end portions. The head rest support frame 20 thus constructed and arranged is rockable in its entirety about a horizontal axis between an approximately horizontal predetermined upper angular position close to the underside of the longitudinally intermediate portion of the inner roof panel 3 of the vehicle body structure and an approximately vertical predetermined lower angular position operative to have the head of the wheelchair occupant 6*b* received on the front face of the head rest pad 30 as indicated in FIG. 13. The lock-unlock unit 24 in the head rest assembly 16′ is constructed and arranged as previously described with reference to FIGS. 10 and 11.

What is claimed is:

1. A wheelchair carrying vehicle having a vehicle body structure including a floor panel and an inner roof panel above the floor panel, the floor panel being adapted to have supported thereon a wheelchair, said vehicle having a head rest assembly which comprises a head rest support frame which is rockable about a pivotal axis fixed with respect to the vehicle body structure and loated adjacent said roof panel and which is lengthwise extensible toward and collapsible away from said axis, at least one head rest member supported on said head rest support frame, the head rest assembly being rockable about said axis between a predetermined uppermost angular position having said head rest member positioned close to the underside of the roof panel and a predetermined lowermost angular position having the head rest member positioned adjacent the head portion of an occupant of said wheelchair, a lock-unlock unit securely held in position adjacent said axis and comprising a lock control lever rockable about said axis and securely connected to said head rest support frame, the lock-unlock unit being operable for having the lock control lever selectively locked to and unlocked from the vehicle body structure; and manually-operated lock-unlocked control means operatively connected to said lock-unlock unit for having said lock control lever locked to or unlocked from the vehicle body structure, wherein said lock-unlock unit further comprises a support member securely connected to the vehicle body structure, first and second rocking arms which are disposed on the support member and which are rockable together with respect to the support member about a common axis substantially parallel with said pivotal axis and fixed with respect to the support member, said lock control lever being selectively locked to and unlocked from the support member, the first and second rocking arms being rockable about said common axis in a first direction to have said lock control lever locked to the support member and a second direction to have the lock control lever unlocked from the support member;

biasing means connected between said lock control means and said first and second rocking arms and urging said rocking arms for rocking motion in said second direction about said common axis;

a cam member rockable with respect to the support member about said pivotal axis;

a coupling member providing engagement between the second rocking arm and said cam member for translating an angular movement of the second rocking arm about said common axis into an angular movement of the cam member about said pivotal axis;

a cam follower member rockable with respect to said support member about a cam follower axis substantially parallel with said pivotal axis and fixed with respect to the support member, said cam member being engageable with said cam follower member for driving the cam follower member for rocking motion about the cam follower axis when the cam member is caused to turn in one direction about said common axis; and a toothed lock member rockable with said cam follower member about said cam follower axis between a predetermined first angular position to have said lock control lever locked to said support member and a predetermined second angular position to have the lock control lever unlocked from the support member, the toothed lock member having an arcuately curved toothed edge portion;

said lock control lever having a toothed edge portion arcuately curved about said pivotal axis and engageable with the toothed edge portion of the toothed lock member, the respective toothed edge portions of the toothed lock member and the lock control member being held in mesh with each other when the toothed lock member is held in said first angular position thereof and being disengaged from each other when the toothed locked member is held in said second angular position thereof.

2. A wheelchair carrying vehicle as set forth in claim 1, in which said lock-unlock unit further comprises a spiral torsion spring having an innermost end portion angularly movable with said lock control lever about said pivotal axis and an outermost end portion engageable with said support member for being brought into elastically pressing engagement with the support member when the lock control lever is caused to turn in a direction to be unlocked from the support member.

3. A wheelchair carrying vehicle as set forth in claim 1, in which said cam member has a cam portion to be held in driving engagement with said cam follower member when the cam member is driven for rocking motion about said pivotal axis by said first and second rocking arms which are turned in said second direction about said common axis, said toothed lock member being held in said second angular position thereof when said cam follower member is held in engagement with said cam portion.

4. A wheelchair carrying vehicle as set forth in claim 3, in which said cam member has carried thereon a roller to be held in driving engagement with said cam follower member for driving said toothed lock member for rocking motion into said first angular position thereof when the cam member is driven for rocking motion about said pivotal axis.

5. A wheelchair carrying vehicle as set forth in claim 4, said lock-unlock unit further comprises biasing means urging said cam member into rocking motion about said common axis in a direction to drive, through said cam follower member, said toothed lock member toward said first angular position thereof.

6. A lock-unlock unit as set forth in any of claims 1 to 5, in which said head rest support frame comprises a pair of side posts spaced apart substantially in parallel from each other in a lateral direction of the vehicle body structure, each of the side posts comprising an upper tubular segment rockable about said pivotal axis, a lower tubular segment telescopically connected to said upper tubular segment, and a locking sleeve engaging with both of the upper and lower tubular segments and adapted to have the upper and lower tubular segments selectively locked to and unlocked from each other.

7. A wheelchair carrying vehicle as set forth in claim 6, in which each of the respective lower tubular segments of said side posts has a lower end portion turned back upwardly and in which said head rest member is mounted on the respective lower end portions of the lower tubular segments of said side posts.

8. A wheelchair carrying vehicle as set forth in any of claims 1 to 5, in which said axis is directed laterally of the vehicle body structure.

9. A wheelchair carrying vehicle having a vehicle body structure including a floor panel and an inner roof panel above the floor panel, the floor panel being adapted to have supported thereon at least two wheelchairs including first and second wheelchairs, comprising the combination of a first head rest assembly for use with the first wheelchair and a second head rest assembly for use with the second wheelchair, wherein said first head rest assembly comprises (1) a generally U-shaped head rest support frame having a middle portion and a pair of side arm portions pivotally connected at their leading ends to inner side wall portions, respectively, of the vehicle body structure, (2) a head rest pad securely mounted to the middle portion of the support frame, (3) a lock-unlock unit secured to the vehicle body structure, the head rest support frame being thus angularly movable with respect to the vehicle body structure and accordingly to said first wheelchair about the pivoted leading ends of said support frame between a predetermined upper limit position having the head rest pad located close to the underside of the roof panel of the vehicle body structure and a predetermined lower limit position having the head rest pad located immediately at the rear of the portion of an occupant of the first wheelchair, said lock-unlock unit being adapted to have the head rest support frame locked in a desired angular position between these two limit angular positions thereof, and (4) at least one operating lever for manually moving the head rest support frame between the two angular positions, the operating lever being mounted on one of said side arm portions of the head rest support frame and being operatively connected to said lock-unlock unit by a flexible wire, and wherein said second head rest assembly comprises (1) a head rest support frame which is rockable about a pivotal axis fixed with respect to the vehicle body structure and located adjacent said roof panel and which is lengthwise extensible toward and collapsible away from said pivotal axis, (2) at least one head rest member supported on said head rest support frame of the second head rest assembly, the head rest assembly being rockable about said axis between a predetermined uppermost angular position having said head rest member positioned close to the underside of the roof panel and a predetermined lowermost angular position having the head rest member positioned adjacent the head portion of an occupant of said second wheelchair carrying vehicle, (3) a lockunlock unit securely held in position adjacent said pivotal axis and comprising a lock control lever rockable about said pivotal axis and securely connected to said head rest support frame of the second head rest assembly, the lock-unlock unit of the second head rest assembly being operable for having the ock control lever selectively locked to and unlocked from the vehicle body structure; and (4) manually-operated lockunlock control means opesratively connected to said lockunlock unit of the second head rest assembly for having said lock control lever locked to or unlocked from the vehicle body structure, said lock-unlock unit further comprising a support member securely connected to the vehicle body structure, first and second rocking arms which are disposed on the support member and which are rockable together with respect to the support member about a common axis substantially parallel with said pivotal axis and fixed with respect to the support member, and lock control lever being selectively locked to and unlocked from the support member, the first and second rocking arms being rockable about said common axis in a first direction to have said lock control lever locked to the support member and a second direction to have the lock control lever unlocked from the support member;

biasing means connected between said lock control means and said first and second rocking arms and urging said rocking arms for rocking motion in said second direction about said common axis;

a cam member rockable with respect to the support member about said pivotal axis;

a coupling member providing engagement between the second rocking arm and said cam member for translating an angular movement of the second rocking arm about said common axis into an angular movement of the cam member about said pivotal axis;

a cam follower member rockable with respect to said support member about a cam follower axis substantially parallel with said pivotal axis and fixed with respect to the support member, said cam member being engageable with said cam follower member for driving the cam follower member for rocking motion about the cam follower axis when the cam member is caused to turn in one direction about said common axis; and a toothed lock member rockable with said cam follower member about said cam follower axis between a predetermined first angular position to have said lock control lever locked to said support member and a predetermined second angular position to have the lock control lever unlocked from the support member, the toothed lock member having an arcuately curved toothed edge portion;

said lock control lever having a toothed edge portion arcuately curved about said pivotal axis and engageable with the toothed edge portion of the toothed lock member, the respective toothed edge portions of the toothed lock member and the lock control member being held in mesh with each other when the toothed lock member is held in said first angular position thereof and being disengaged from each other when the toothed locked member is held in said second angular position thereof.

10. A wheelchair carrying vehicle as set forth in claim 9, in which the first and second head rest assemblies are arranged in series in a fore-and-aft direction of the vehicle.

* * * * *